(12) United States Patent
Brown et al.

(10) Patent No.: US 6,937,377 B1
(45) Date of Patent: Aug. 30, 2005

(54) DUAL LAMP PROJECTION SYSTEM

(75) Inventors: Robert D. Brown, Lake Oswego, OR (US); David H. Modro, Tigard, OR (US)

(73) Assignee: Rockwell Collins, Cedar Rapids, IA (US)

( * ) Notice: Subject to any disclaimer, the term of this patent is extended or adjusted under 35 U.S.C. 154(b) by 7 days.

(21) Appl. No.: 10/706,571

(22) Filed: Nov. 12, 2003

(51) Int. Cl.⁷ .............................. G02B 1/00; G02F 1/07; G03B 15/02
(52) U.S. Cl. ...................... 359/237; 359/246; 359/245; 362/19; 362/11
(58) Field of Search ............................... 359/237, 246, 359/245, 485, 494, 495, 484; 362/19, 11, 362/13, 18

(56) References Cited

U.S. PATENT DOCUMENTS

| | | | |
|---|---|---|---|
| 5,059,917 A | * | 10/1991 | Stephens .................... 359/347 |
| 5,777,789 A | * | 7/1998 | Chiu et al. ................... 359/494 |
| 2003/0128427 A1 | * | 7/2003 | Kalmanash et al. ........ 359/484 |

* cited by examiner

Primary Examiner—Timothy Thompson
(74) Attorney, Agent, or Firm—Nathan O. Jensen; Kyle Eppele

(57) ABSTRACT

An illumination system is disclosed, which includes a first light source and a second light source configured to emit light when the first light source is not emitting light. A polarizing element accepts light from the first and second light sources. The polarizing element emits, along a light path, light from the first light source with a first polarization orientation. The polarizing element emits, along the light path, light from the second light source with a second polarization orientation. A homogenizing element receives and homogenizes polarized light from the polarizing element. A polarization rotator receives light from the homogenizing element. The polarization rotator selectively rotates one of the first and second polarization orientations to ensure light emitted therefrom maintains a constant polarization orientation.

16 Claims, 4 Drawing Sheets

DUAL LAMP PROJECTION SYSTEM

FIELD OF THE INVENTION

The invention relates to optics, and more particularly, to a system and method for providing a failsafe lighting source.

BACKGROUND OF THE INVENTION

Projection displays based on liquid-crystal displays (LCDs) have found wide acceptance throughout many technology fields. Because of their size, cost, and adaptability advantages relative to other types of displays, LCD projection displays are finding greater acceptance in, for example, cockpit avionics systems. When used in flight-critical avionics systems, however, the displays must be designed with a certain level of redundancy in to ensure uninterrupted operation in the event of a failure.

One portion of an LCD projection display that is particularly susceptible to recurring failure is the light source. An arc lamp is commonly used as a light source for an LCD projection display because of ready availability, low cost, and chromaticity requirements. However, arc lamps are notoriously unreliable and short-lived, and a single lamp, by itself, might not be considered a suitable light source for a high-reliability display in certain critical applications. Dual lamp systems have been developed to provide satisfactory redundancy, but such dual lamp systems usually increase the size of the lighting system and may thereby make the system unsuitable for some applications. Furthermore, known dual lamp systems require additional mechanical parts to change from one lamp to the other lamp in case of failure, and the mechanical parts increase the possibility of system breakdown. Lastly, the designs of known dual lamp systems usually create unacceptable levels of insertion loss. What is needed, therefore, is a failsafe illumination system, suitable for use as a light source for an LCD projection display, with a minimum of moving parts and a minimum of insertion loss.

It is therefore an object of the invention to provide a failsafe illumination system for an LCD projection display.

It is another object of the invention to provide a failsafe illumination system that uses a minimum number of moving parts.

It is a further object of the invention to provide a failsafe illumination system that is as efficient as a standard illumination system.

It is a further object of the invention to provide a failsafe illumination system that uses readily available components.

A feature of the invention is the relative orthogonal polarization of two light sources, with the polarization orientation of one of the light sources being rotated to ensure the light output from the system has a constant polarization orientation.

An advantage of the invention is the provision of a compact illumination system with no mechanical moving parts.

SUMMARY OF THE INVENTION

The invention provides an illumination system including a first light source and a second light source configured to emit light when the first light source is not emitting light. A polarizing element accepts light from the first and second light sources. The polarizing element emits, along a light path, light from the first light source with a first polarization orientation. The polarizing element emits, along the light path, light from the second light source with a second polarization orientation. A homogenizing element receives and homogenizes polarized light from the polarizing element. A polarization rotator receives light from the homogenizing element. The polarization rotator selectively rotates one of the first and second polarization orientations to ensure light emitted therefrom maintains a constant polarization orientation.

The invention also provides a failsafe illumination system that supplies light having a predetermined polarization orientation. The failsafe illumination system includes a first light source configured to emit light along a first light path. A second light source is configured to emit light, along a second light path substantially orthogonal to the first light path, when the first light source is not emitting light. A polarizing element, such as a polarizing beamsplitter, is placed at an intersection of the first light path and the second light path. The polarizing element is configured to impart a first polarization orientation to light from the first light source and a second polarization orientation to light from the second light source. The second polarization orientation is substantially orthogonal to the first polarization orientation. A polarization rotator is positioned to accept light from the polarizing element. The polarization rotator rotates one of the first and second polarization orientations such that light exiting therefrom maintains the predetermined polarization orientation. A polarization maintaining element is positioned between the polarizing element and the polarization rotator and is configured to substantially maintain the first polarization orientation and the second polarization orientation between the polarizing element and the polarization rotator.

The invention further provides a method of providing a failsafe illumination system that supplies light having a predetermined polarization orientation. According to the method, a first light source is actuated to emit light. The light from the first light source is polarized to have a first polarization orientation. A second light source is actuated to emit light when the first light source is not emitting light. The light from the second light source is polarized to have a second polarization orientation. The light having the first polarization orientation and the light having the second polarization orientation are alternately directed through a light pipe. The first polarization orientation is maintained while the light from the first light source is in the light pipe. The second polarization orientation is maintained while the light from the second light source is in the light pipe. Either the first polarization orientation or the second polarization orientation is rotated after the light exits the light pipe.

DETAILED DESCRIPTION OF THE DRAWINGS

Figure 1:
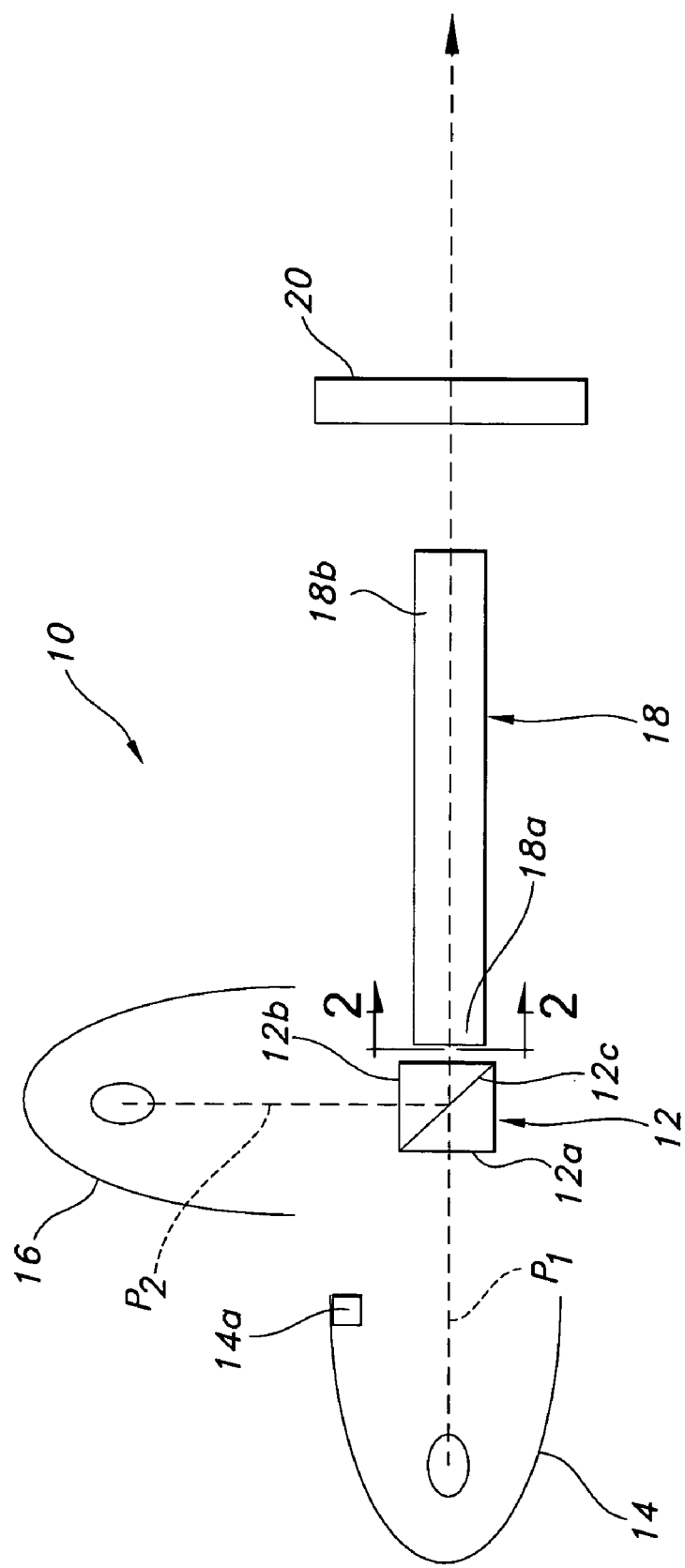
FIG. 1 is a schematic diagram of an illumination system according to an embodiment of the invention.

An illumination system according to an embodiment, advantageously used to illuminate an LCD microdisplay, is shown in FIG. 1 and is indicated generally by reference number 10. System 10 includes a polarizing element 12 that accepts light from more than one light source and emits light having one of two polarization states. In a preferred embodiment, polarizing element 12 is a polarization beam splitter or combiner (PBS) having first and second orthogonal faces 12a, 12b and an internal partially reflective polarizing plane 12c. As depicted in FIG. 1, a primary light source, such as a first arc lamp 14, emits light along a first light path $P_1$, through optional lenses or other optical devices (not shown) and into first face 12a of polarizing element 12. First arc lamp 14 includes a sensor 14a to detect a failure of the first arc lamp. A backup light source, such as second arc lamp 16, emits light along a second light path $P_2$, through optional lenses or other optical devices (not shown) and into second face 12b of the polarizing element. The orientation of the polarization imparted to light by the polarizing element is determined by the direction of the incoming light. For example, the polarizing element imparts a first polarization orientation to light entering first face 12a. In contrast, the polarizing element imparts a second polarization orientation to light entering second face 12b. In commonly-used optical nomenclature, the first and second polarization orientations are known as the p orientation and the s orientation, respectively. As depicted, therefore, light from first arc lamp 14 exits polarizing element 12 with the p orientation, and light from second lamp 16 exits polarizing element 12 with the s orientation.

Figure 2:
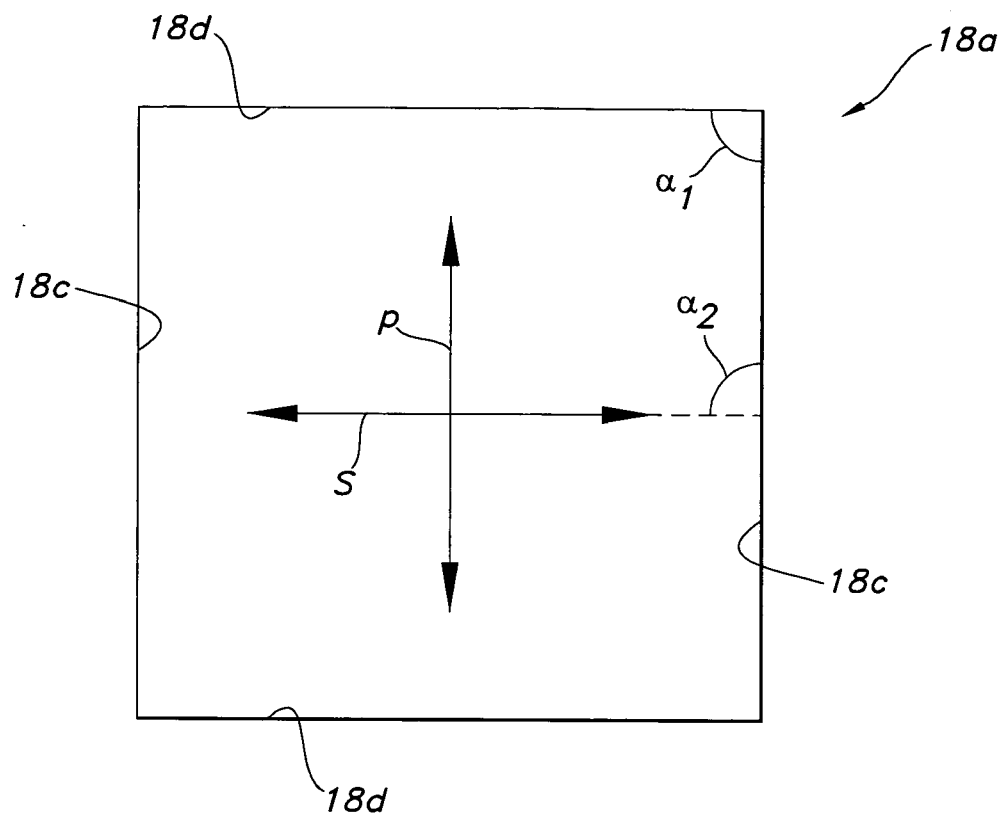
FIG. 2 is a cross sectional view taken along line 2—2 in FIG. 1.

A light pipe 18, having first and second ends 18a, 18b, is positioned along first light path $P_1$. Light pipe 18 spatially homogenizes light passing therethrough to uniformly illuminate a device such as a microdisplay (not shown) in a digital projector (not shown). The light pipe is shaped and positioned to maintain the polarization of light passing therethrough. FIG. 2, which depicts first end 18a of the light pipe, shows that the light pipe has a square cross-section, with internal surfaces 18c of the light pipe as orthogonal as possible to internal surfaces 18d of the light pipe. The light pipe is positioned along first light path P1 so that (a) internal surfaces 18c are orthogonal or perpendicular to light exiting polarizing element 12 having the s orientation, and (b) internal surfaces 18d are orthogonal or perpendicular to light exiting the polarizing element having the p orientation. If internal surfaces 18c, 18d are not perfectly orthogonal to each other, or if each set of internal surfaces are not perfectly orthogonal to one of the p and s orientations, the polarization state of the light will degrade within the light pipe. However, the polarization degradation is proportional to (a) the sine of the angle between internal surface 18c and internal surface 18d (for example, $\alpha_1$), and (b) the sine of the angle between a direction of a polarization orientation and an internal surface 18c or 18d of the light pipe (for example, $\alpha_2$). Slight non-orthogonal variations in the positioning and construction of the light pipe therefore do not significantly degrade the polarization state of light passing through the light pipe.

Returning to FIG. 1, a polarization rotator 20 is positioned adjacent second end 18b of light pipe. Lenses or other optical devices may be positioned before or after the polarization rotator as desired. Polarization rotator 20, which is preferably a liquid crystal variable retarder, selectively rotates the polarization state of light passing therethrough. For example, an LCD microdisplay is typically highly sensitive to the polarization state of illuminating light, and may further require its light source to have a specific polarization state. Polarization rotator 20 is therefore programmed to rotate, if necessary, the polarization state of incoming light to conform to polarization output requirements.

Figure 3:
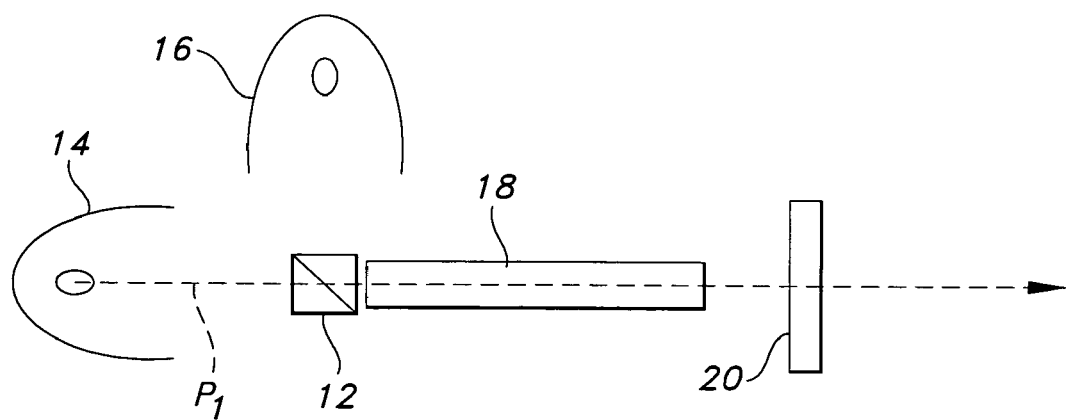
FIG. 3 is a schematic diagram of the illumination system of the invention operating in a normal mode.

Operation of system 10 will now be described. In a normal mode of operation, which is shown in FIG. 3, first arc lamp 14 emits light into polarizing element 12 along first path P1. Second arc lamp 16 does not emit light in the normal mode of operation. Polarizing element 12 polarizes the light from first arc lamp 14 to have the p polarization orientation, and the polarized light exits the polarizing element. The polarized light passes through light pipe 18, which homogenizes the polarized light and maintains the p orientation of the polarized light. The polarized and homogenized light then passes through polarization rotator 20. Assuming the polarized light produced by system 10 is required to have the p polarization orientation, polarization rotator 20 does not rotate the polarization of the light.

Figure 4:
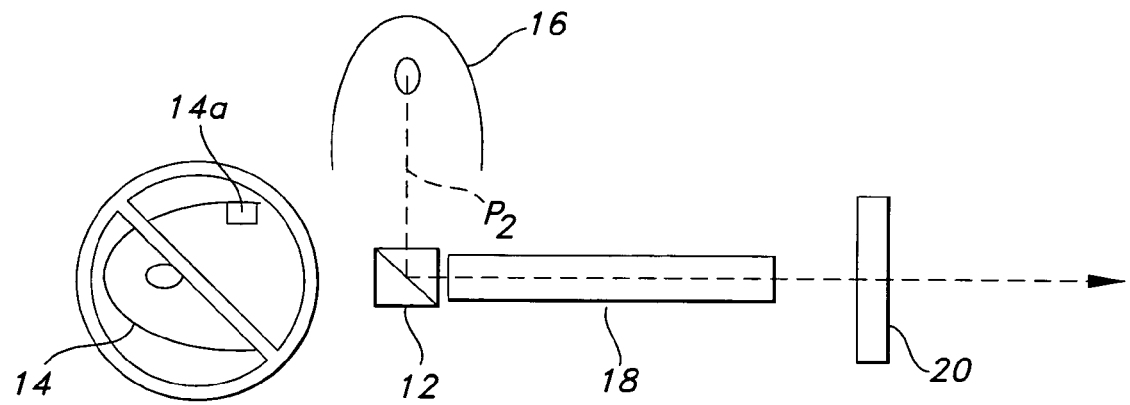
FIG. 4 is a schematic diagram of the illumination system of FIG. 1 in a failsafe mode.

If sensor 14a detects a failure of first arc lamp 14, power to the first arc lamp is turned off, and power to second arc lamp 16 turned on. As shown in FIG. 4, second arc lamp 16 emits light along second light path P2. Polarizing element 12 polarizes the light from second arc lamp 16 to have the s polarization orientation, and the polarized light exits the polarizing element. The polarized light passes through light pipe 18, which homogenizes the polarized light and maintains its s orientation. The polarized and homogenized light then passes through polarization rotator 20. To maintain the p polarization of the system, a signal is sent to polarization rotator 20 to rotate the polarization of the light from the s polarization to the p polarization. System 10 thereby provides a failsafe source of illumination with a constant and predictable polarization state.

Figure 5:
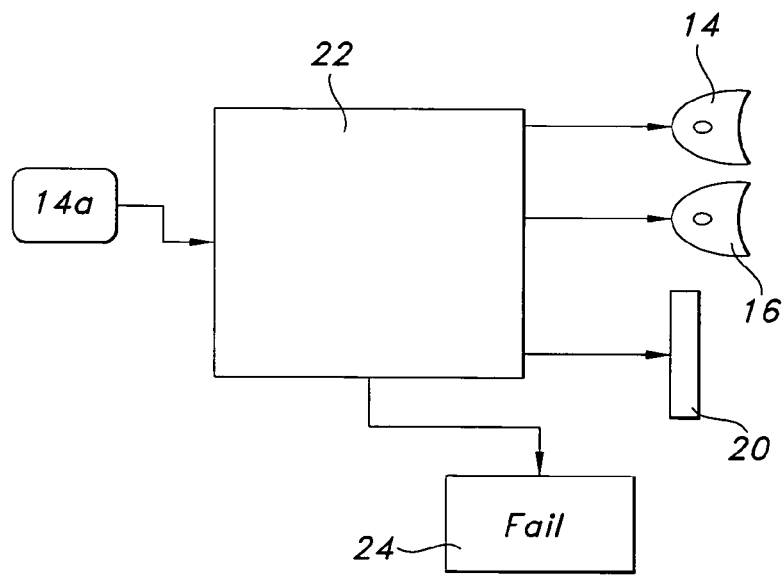
FIG. 5 is a schematic diagram of a processor/controller unit used to control the illumination system according to the invention.
Figure 6:
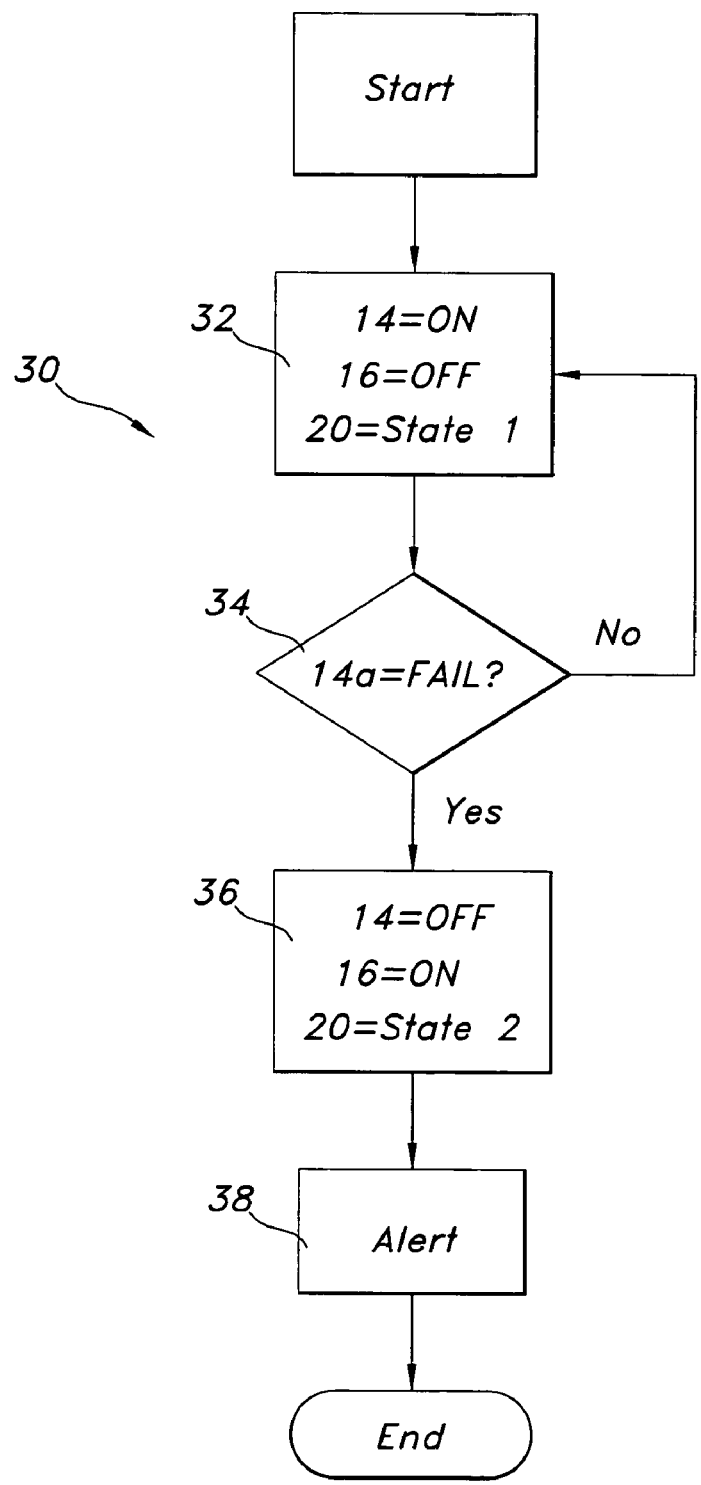
FIG. 6 is a flowchart showing a method of controlling the illumination system according to the invention.

The decision and control process outlined above may be accomplished by a processor/controller unit 22 as shown in FIG. 5 and by reference to the method 30 depicted in FIG. 6. Processor/controller unit 22 monitors an output from sensor 14a. In the normal mode, the processor/controller unit controls first arc lamp 14 to be powered up and second arc lamp 16 to be turned off. The processor/controller unit also controls polarization rotator 20 to be in a first state. These commands are shown in step 32 in FIG. 6. If in step 34 the sensor does not indicate a failure of first arc lamp, the processor/controller unit continues to control the system as shown in step 32. If the sensor indicates a failure of first arc lamp 14, in step 36 the processor/controller turns off the first arc lamp and powers up the second arc lamp. The polarization rotator is controlled to be in a second state. The first and second states of the polarization rotator correspond to either rotating the polarization of the light or maintaining the polarization orientation of the light passing therethrough, as dictated by known polarization output requirements. In step 38 an alert 24 is provided to a viewer and/or a notice is provided to a maintenance system monitoring the system.

The invention may be varied in many ways. For instance, the light pipe is described as having a square cross-section. However, the light pipe may also be rectangular. Light pipes having square or rectangular cross-sections have been shown to be the most effective at preserving the polarization orientation of light passing therethrough, although other suitable cross-section shapes may be used as well.

Another variation is that although the arc lamps are depicted as orthogonal to each other, the use of mirrors or other optics may enable the arc lamps to be disposed at other angles to each other, with the light emitted therefrom entering the polarization beam splitter at right angles. Of course, other types of polarizing elements may be used, such as wire grid beamsplitters, and the relative angle of the light from the two arc lamps may be adjusted to accommodate the requirements of the polarizing element. Furthermore, depending on space and chromaticity requirements, other types of light sources may be used, such as LED arrays, fluorescent lamps, polarization conversion systems used with a light source, or other suitable light sources. Lastly, a separate polarizing element may be employed for each light source.

An advantage of the invention is that no moving parts are required to switch from a normal mode to a failsafe mode. The back-up light source is merely activated, and the polarization rotator is energized to change from one state to another state. With no moving parts, the illumination system is inexpensive to manufacture and maintain, and a minimal number of system failures are expected.

Another advantage of the invention is that although the ability of the light pipe to maintain the polarization orientation of light passing therethrough is proportional to certain manufacturing and positioning parameters as described above, slight variations in said manufacturing and positioning parameters do not substantially affect the performance of the light pipe.

Still another advantage of the invention is that the use of commonly available components reduces the need for expensive optics. The illumination system can therefore be used in a variety of applications requiring a reliable source of light with a predetermined and constant polarization state. Such applications include a lighting system for an LCD projection display that may be used in avionics equipment.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. An illumination system, comprising:
   a first light source;
   a second light source configured to emit light when the first light source is not emitting light;
   a polarizing element that accepts light from the first and second light sources and emits, along a light path, light from the first light source with a first polarization orientation, and wherein the polarizing element emits, along the light path, light from the second light source with a second polarization orientation;
   a homogenizing element that receives and homogenizes polarized light from the polarizing element, wherein the homogenizing element is a light pipe positioned to substantially preserve the first and second polarization orientations, and further wherein the light pipe has a first set of interior surfaces and a second set of interior surfaces, the light pipe being positioned such that the first set of interior surfaces are orthogonal to the first polarization orientation and the second set of interior surfaces are orthogonal to the second polarization orientation; and
   a polarization rotator that receives light from the homogenizing element and selectively rotates one of the first and second polarization orientations to ensure light emitted therefrom maintains a constant polarization orientation.

2. The illumination system of claim 1, wherein the first light source is positioned such that light emitted therefrom is collinear to the light path.

3. The illumination system of claim 2, wherein the second light source is positioned such that light emitted therefrom enters the polarizing element in a direction orthogonal to the light path.

4. The illumination system of claim 1, wherein the polarizing element is a polarization beam splitter having first and second faces, and wherein light from the first light source enters the first face and light from the second light source enters the second face.

5. The illumination system of claim 1, further comprising:
   a sensor operationally connected to the first light source, the sensor detecting an operational state of the first light source;
   wherein the illumination system is configured to activate the second light source when the sensor detects a failure of the first light source.

6. A failsafe illumination system that provides light having a predetermined polarization orientation, comprising:
   a first light source configured to emit light;
   a second light source configured to emit light when the first light source is in a failure mode;
   a polarizing element, positioned to impart a first polarization orientation to light from the first light source and a second polarization orientation to light from the second light source, the second polarization orientation being substantially orthogonal to the first polarization orientation:
   a polarization rotator positioned to accept light from the polarizing element, the polarization rotator configured to rotate one of the first and second polarization orientations such that light exiting therefrom maintains the predetermined polarization orientation; and
   a polarization maintaining element positioned between the polarizing element and the polarization rotator and configured to substantially maintain the first polarization orientation and the second polarization orientation between the polarizing element and the polarization rotator, wherein the polarization maintaining element is a light pipe having a first end adjacent the polarizing element and a second end adjacent the polarization rotator, the light pipe further having a first pair of internal surfaces orthogonal to the first polarization orientation and a second pair of internal surfaces orthogonal to the second polarization orientation.

7. The failsafe illumination system of claim 6, further comprising a sensor associated with the first light source and configured to detect a failure of the first light source.

8. The failsafe illumination system of claim 7, further comprising:
a controller that, in a normal mode, controls the first light source to be activated, the second light source to be deactivated, and the polarization rotator to be in a first rotation state.

9. The failsafe illumination system of claim 8, wherein the controller, in response to a signal from the sensor indicating a failure of the first light source, controls the second light source to be activated and the polarization rotator to be in a second rotation state.

10. The failsafe illumination system of claim 6, wherein the light pipe has a square cross-section.

11. The failsafe illumination system of claim 6, wherein the light pipe has a rectangular cross-section.

12. A method of providing a failsafe illumination system that provides light having a predetermined polarization orientation, the method comprising:
actuating a first light source to emit light;
polarizing the light from the first light source to have a first polarization orientation;
actuating a second light source to emit light when the first light source is not emitting light;
polarizing the light from the second light source to have a second polarization orientation;
alternately directing, through a light pipe, the light having the first polarization orientation and the light having the second polarization orientation, wherein the light pipe has a first set of interior surfaces and a second set of interior surfaces;
positioning the light pipe such that the first set of interior surfaces are orthogonal to the first polarization orientation and the second set of interior surfaces are orthogonal to the second polarization orientation;
maintaining the first polarization orientation while the light from the first light source is in the light pipe;
maintaining the second polarization orientation while the light from the second light source is in the light pipe; and
rotating one of the first polarization orientation and the second polarization orientation after the light exits the light pipe.

13. The method of claim 12, wherein the rotating step comprises rotating the second polarization orientation to the first polarization orientation when the first light source is not emitting light, and wherein the first polarization orientation is the predetermined polarization orientation.

14. The method of claim 12, wherein the rotating step comprises rotating the first polarization orientation to the second polarization orientation when the first light source is emitting light, and wherein the second polarization orientation is the predetermined polarization orientation.

15. The method of claim 12, further comprising:
sensing a failure of the light source; and
activating the second light source when a failure of the first light source is sensed.

16. The method of claim 15, further comprising:
positioning the first light source to emit light along a first light path; and
positioning the second light source to emit light along a second light path, wherein the second light path is non-collinear with the first light path.

* * * * *